US012622545B2

(12) United States Patent
Smith et al.

(10) Patent No.: US 12,622,545 B2
(45) Date of Patent: May 12, 2026

(54) OVEN COOKING SYSTEM, ACCESSORY DEVICE, AND METHOD THEREOF

(71) Applicant: North Atlantic Imports, LLC, Logan, UT (US)

(72) Inventors: Jared M. Smith, Paradise, UT (US); Gary E. Graham, Hyde Park, UT (US); Christopher L. Hanks, Nibley, UT (US)

(73) Assignee: North Atlantic Imports, LLC, Providence, UT (US)

( * ) Notice: Subject to any disclaimer, the term of this patent is extended or adjusted under 35 U.S.C. 154(b) by 598 days.

(21) Appl. No.: 17/856,994

(22) Filed: Jul. 2, 2022

(65) Prior Publication Data

US 2023/0000284 A1      Jan. 5, 2023

Related U.S. Application Data

(60) Provisional application No. 63/218,308, filed on Jul. 3, 2021.

(51) Int. Cl.
*A47J 37/07*          (2006.01)
*A47J 37/01*          (2006.01)
*A47J 37/06*          (2006.01)

(52) U.S. Cl.
CPC ........... *A47J 37/0713* (2013.01); *A47J 37/01* (2013.01); *A47J 37/0763* (2013.01); *A47J 37/0658* (2013.01)

(58) Field of Classification Search
CPC .... A47J 37/01; A47J 37/0658; A47J 37/0713; A47J 37/0763

USPC ......................................................... 126/1 R
See application file for complete search history.

(56) References Cited

U.S. PATENT DOCUMENTS

| | | |
|---|---|---|
| 3,033,189 A | 5/1962 | Clark |
| 3,033,190 A | 5/1962 | Atkinson |
| 3,085,497 A | 4/1963 | Statia, Sr. |
| 3,131,685 A | 5/1964 | Bergfield |
| 3,134,320 A | 5/1964 | Meyer |
| 3,298,301 A | 1/1967 | Lowndes |

(Continued)

*Primary Examiner* — Steven B Mcallister
*Assistant Examiner* — Benjamin W Johnson
(74) *Attorney, Agent, or Firm* — David L. Stott

(57) ABSTRACT

An oven member that may be positioned over a cooking station base with gas flame burners. The oven member includes an inner shell, an outer shell, and lower and upper stones. The inner shell includes a ridge and a ledge and positioned over the cooking station base. The lower stone is configured to be positioned adjacent the ridge of the inner shell and the upper stone is configured to be positioned adjacent the ledge of the inner shell so that the lower stone is positioned parallel relative to the upper stone to at least partially define a baking chamber between the lower and upper stones. The outer shell is sized to be positioned over the inner shell with a gap defined between the inner and outer shells, the outer shell including an oven door positionable over an access opening defined in the outer shell. The access opening is sized and configured to facilitate accessing food product in the baking chamber such that the access opening is accessed along a front side of the oven member. Further, the inner shell defines one or more exhaust ports positioned at a level below the upper stone to funnel heat directly from the baking chamber.

17 Claims, 6 Drawing Sheets

(56)  References Cited

U.S. PATENT DOCUMENTS

| 3,448,679 | A |   | 6/1969 | Holka et al. |
| 3,511,167 | A |   | 5/1970 | Holtkamp |
| 3,552,299 | A |   | 1/1971 | Patoka |
| 3,657,996 | A |   | 4/1972 | Thompson |
| 3,848,523 | A |   | 11/1974 | Galisz |
| 4,305,329 | A |   | 12/1981 | Fenoglio |
| 4,384,513 | A |   | 5/1983 | Pierick |
| 4,506,652 | A |   | 3/1985 | Baker et al. |
| 4,800,865 | A | * | 1/1989 | Setzer ................ A47J 37/0704 |
|  |  |  |  | 99/481 |
| 4,805,587 | A |   | 2/1989 | Schweitzer |
| 4,805,588 | A | * | 2/1989 | Reynolds ........... A47J 37/0682 |
|  |  |  |  | 126/41 A |
| 4,938,687 | A |   | 7/1990 | Monteil |
| 5,378,872 | A |   | 1/1995 | Javanovic |
| 5,398,666 | A |   | 3/1995 | Smith et al. |
| 5,492,055 | A |   | 2/1996 | Nevin et al. |
| 5,523,104 | A |   | 6/1996 | Kirk |
| 5,682,873 | A |   | 11/1997 | Chambers |
| 5,873,300 | A |   | 2/1999 | Kuhlman |
| 6,041,769 | A |   | 3/2000 | Llodra, Jr. et al. |
| 6,125,740 | A |   | 10/2000 | Hedrington et al. |
| 6,146,677 | A |   | 11/2000 | Moreth |
| 6,187,359 | B1 |   | 2/2001 | Zuccarini |
| 6,250,210 | B1 |   | 6/2001 | Moreth |
| 6,307,185 | B1 |   | 10/2001 | Loveless |
| 6,354,194 | B1 |   | 3/2002 | Hedrington et al. |
| 6,425,388 | B1 |   | 7/2002 | Korinchock |
| 6,640,695 | B2 |   | 11/2003 | Stark |
| 6,708,604 | B1 |   | 3/2004 | Deichler, Jr. |
| 6,967,036 | B1 |   | 11/2005 | Hedrington et al. |
| 7,219,663 | B2 |   | 5/2007 | Cuomo |
| D555,419 | S |   | 11/2007 | Reckert et al. |
| D580,214 | S |   | 11/2008 | Dodane |
| D594,271 | S |   | 6/2009 | Bodum |
| 7,686,010 | B2 |   | 3/2010 | Gustavsen |
| 8,093,533 | B2 |   | 1/2012 | French et al. |
| D657,992 | S |   | 4/2012 | Moodie et al. |
| 8,181,640 | B2 |   | 5/2012 | Park |
| 8,291,896 | B1 |   | 10/2012 | Gonnella et al. |
| 8,578,927 | B2 |   | 11/2013 | Gustavsen |
| D696,057 | S |   | 12/2013 | Green et al. |
| D697,751 | S |   | 1/2014 | Schleinzer |
| D732,335 | S |   | 6/2015 | Thonis |
| 9,491,951 | B2 |   | 11/2016 | Case |
| D788,518 | S |   | 6/2017 | Aggarwal |
| D815,884 | S |   | 4/2018 | Freeman |
| 10,575,680 | B2 |   | 3/2020 | Fagg et al. |
| D891,171 | S |   | 7/2020 | Papet et al. |
| 10,941,945 | B2 |   | 3/2021 | Tapaninaho |
| 11,134,690 | B1 |   | 10/2021 | French et al. |
| 2002/0017290 | A1 |   | 2/2002 | Hines, Jr. |
| 2006/0102167 | A1 |   | 5/2006 | Driscoll, Jr. |
| 2006/0191528 | A1 |   | 8/2006 | Spangrud |
| 2010/0124596 | A1 |   | 5/2010 | Nelson |
| 2010/0147281 | A1 |   | 6/2010 | Gustavsen |
| 2013/0276643 | A1 | * | 10/2013 | Krolick ................... F24B 1/003 |
|  |  |  |  | 99/447 |
| 2014/0014086 | A1 |   | 1/2014 | Case |
| 2014/0026881 | A1 |   | 1/2014 | Abrams et al. |
| 2014/0287119 | A1 | * | 9/2014 | Dahle ..................... F24C 3/027 |
|  |  |  |  | 426/520 |
| 2015/0323190 | A1 |   | 11/2015 | Stein |
| 2022/0322877 | A1 | * | 10/2022 | Greer ................. A47J 37/0658 |
| 2022/0330751 | A1 | * | 10/2022 | Smith ................. A47J 37/0763 |

* cited by examiner

OVEN COOKING SYSTEM, ACCESSORY DEVICE, AND METHOD THEREOF

CROSS-REFERENCE TO RELATED APPLICATIONS

This application claims the benefit of U.S. Provisional Application No. 63/218,308, filed Jul. 3, 2021, the disclosure of which is hereby incorporated by reference herein in its entirety.

TECHNICAL FIELD

The present invention relates generally to outdoor type cooking stations and, more specifically, the present invention relates to baking oven type outdoor cooking stations.

BACKGROUND

Cooking pizza has become a popular food product which has evolved from the kitchen to the backyard or outdoor camping site. Pizza ovens come in different configurations such as wood-fired brick ovens, electric ovens and gas ovens such that pizza is cooked on either stone or a flat surface which has been heated by either a wood source, electric source or gas source. Most configurations require the pizza to be manually turned as it cooks due to the stone or regions in the oven not being heated evenly. This results in having to be very attentive to manually rotating the pizza within the oven while cooking the pizza. As a result, many pizza ovens provide automatic movement, such as a rotating cooking surface, within the pizza oven to control the baking process and to minimize the concern of unevenly cooking the pizza in the oven. However, dynamic parts within an oven are more susceptible to breaking-down over time. As such, it would be advantageous for a pizza oven to incorporate structure that minimizes the hot-spots and uneven cooking within a pizza oven without the need of an automatic rotating cooking surface.

BRIEF SUMMARY OF THE INVENTION

The present invention is directed to various embodiments of an oven type outdoor cooking system. In one embodiment, a cooking system for baking a food product is provided. The cooking system includes a base body and an oven portion. The base body extends to define an upper edge with one or more gas flame burners supported by the base body. The gas flame burners extend below the upper edge, the base body extending to define a front base side and a rear base side thereof. The oven portion extends to define a front oven side, a rear oven side, and first and second oven sides, the front and rear oven sides corresponding with the front and rear base sides of the base body. The oven portion includes an inner shell, an outer shell, a lower stone, and an upper stone. The inner shell includes a ridge surface and a ledge surface such that the inner shell is sized and configured to be positioned at least partially above the base body. The lower stone is sized to be positioned over the ridge surface and the upper stone is sized to be positioned over the ledge surface so that the lower stone is positioned substantially parallel relative to the upper stone such that a baking chamber is defined therebetween. The outer shell is sized to be positioned over the inner shell with a gap defined between the inner and outer shells. The outer shell includes an oven door positionable over an access opening defined in the outer shell, the access opening sized and configured to facilitate accessing the food product in the baking chamber such that the access opening is accessed along the front oven side of the oven portion. The inner shell defines one or more exhaust ports positioned below the upper stone to funnel heat directly from the baking chamber.

In another embodiment, the oven portion is removable from the base body such that the base body is sized and configured to support a griddle or the oven portion thereon. In another embodiment, the inner shell defines grooves therein, the grooves being sized and configured to be positioned over the gas flame burners of the base body such that the oven portion is moveable from the base body. In another embodiment, the oven door is removable from the oven portion with a door handle. In still another embodiment, the one or more exhaust ports each include a tube extending between the inner shell and the outer shell of the oven portion so that heat from the baking chamber moves externally from the oven portion.

In another embodiment, the cooking system includes a heat distribution plate, the heat distribution plate positioned directly below the lower stone such that the heat distribution plate is spaced from the lower stone with a lower stone gap defined between the heat distribution plate and the lower stone. In yet another embodiment, the outer shell defines vents along a lower periphery thereof and defines top side exhaust ports along a top side of the outer shell, the vents being sized and configured to draw external air into the gap between the inner and outer shells to move the external air within the gap toward the top side of the outer shell to move through the top side exhaust ports of the outer shell. In still another embodiment, the base body includes a heat shield placed on a lower side thereof to block heat produced by the one or more heating elements In accordance with another embodiment of the present invention, an accessory device for use with a cooking station and configured to bake a food product therein. Such cooking station includes a base body extending to define an upper edge with one or more gas flame burners supported by the base body and positioned below the upper edge. The accessory device includes an oven member extending to define a front side, a rear side, and first and second sides, the front and rear oven sides configured to correspond with front and rear base sides of the base body. The oven member includes an inner shell, a lower stone, an upper stone, and an outer shell. The inner shell includes a ridge surface and a ledge surface, the inner shell configured to be positioned at least partially above the base body. Further, the inner shell defining one or more exhaust ports therein. The lower stone is configured to be positioned over the ridge surface of the inner shell and the upper stone is configured to be supported on the ledge surface of the inner shell so that the lower stone is positioned substantially parallel relative to the upper stone such that a baking chamber is defined by the lower and upper stones and at least partially by the inner shell. The exhaust ports are positioned in the inner shell at a level below the upper stone. The outer shell is sized to be positioned over the inner shell with a gap defined between the inner and outer shells. The outer shell includes an oven door positionable over an access opening defined in the outer shell. The access opening is sized and configured to facilitate accessing the food product in the baking chamber such that the access opening is accessed along the front side of the oven member. With the arrangement, the outer shell includes tubing extending from each one of the exhaust ports to the outer shell to funnel heat directly from the baking chamber.

In another embodiment, the oven door is removable from the outer shell. In a further embodiment, the accessor device includes a heat distribution plate, the heat distribution plate positioned directly below the lower stone such that the heat distribution plate is spaced from the lower stone with a lower stone gap defined between the heat distribution plate and the lower stone. In another embodiment, the outer shell defines vents along a lower periphery thereof and defines top side exhaust ports along a top side of the outer shell, the vents being sized and configured to draw external air into the gap between the inner and outer shells to move the external air within the gap toward the top side of the outer shell to move through the top side exhaust ports of the outer shell.

In accordance with another embodiment of the present invention, a method for controlling heat generated by a cooking station base, the cooking station base extending to define an upper edge with one or more gas flame burners supported by the cooking station base and positioned below the upper edge, is provided. The method includes the steps of: providing an oven portion positioned above the cooking station base such that the oven portion includes an inner shell, an outer shell, a lower stone, and an upper stone, the inner shell defining a ridge surface and a ledge surface such that the lower stone is positioned over the ridge surface and the upper stone is positioned over the ledge surface so that the upper stone is positioned substantially parallel relative to the lower stone to define a baking chamber therebetween. The outer shell is positioned over the inner shell with a gap defined between the inner and outer shells, the outer shell being associated with a removable oven door such that the oven door is positionable over an access opening defined in the outer shell; heating the baking chamber with the one or more gas flame burners and with the access opening defined in the outer shell being closed-off with the removable oven door so that the heat from the one or more gas flame burners flows around a heat distribution plate positioned below the lower stone so that the heat flows upward to heat the upper stone; and funneling the heat out of the baking chamber through one or more heat exhaust ports defined in the inner shell such that the one or more heat exhaust ports are positioned at a level below the upper stone.

In another embodiment, the method includes the step of removing the oven door from the pizza open portion with a door handle. In another embodiment, the funneling step includes the step of funneling the heat through a tubes positioned along corresponding ones of the one or more exhaust ports such that the tube extends between the inner shell and the outer shell of the oven portion so that the heat moves from the baking chamber and external the oven portion. In another embodiment, the heating step includes the step of minimizing the heating of the lower stone with the heat distribution plate being spaced from the lower stone with a lower stone gap defined between the heat distribution plate and the lower stone. In another embodiment, the method includes the step of venting external air through the gap with vents defined in the outer shell along a lower periphery of the outer shell and top side exhaust ports defined in the outer shell along a top side of the outer shell such that the external air is drawn through the vents and into the gap between the inner and outer shells to move upward to cool the outer shell and move toward the top side of the outer shell to move through the top side exhaust ports of the outer shell.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
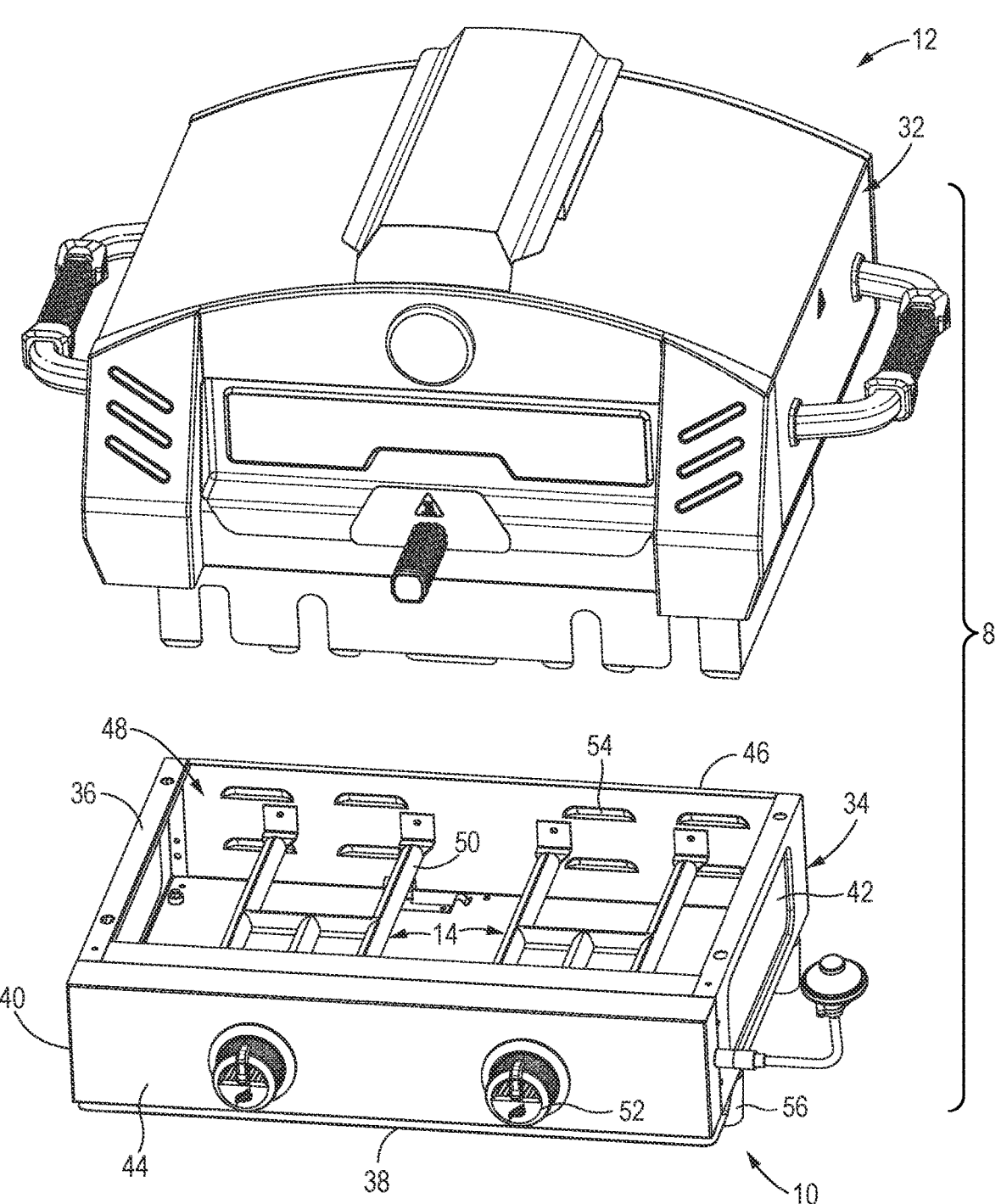
FIG. 1 is a partially exploded view of a cooking station base and pizza oven portion, depicting the pizza oven portion in a pre-assembled position above the cooking station base, according to one embodiment of the present invention.
Figure 2:
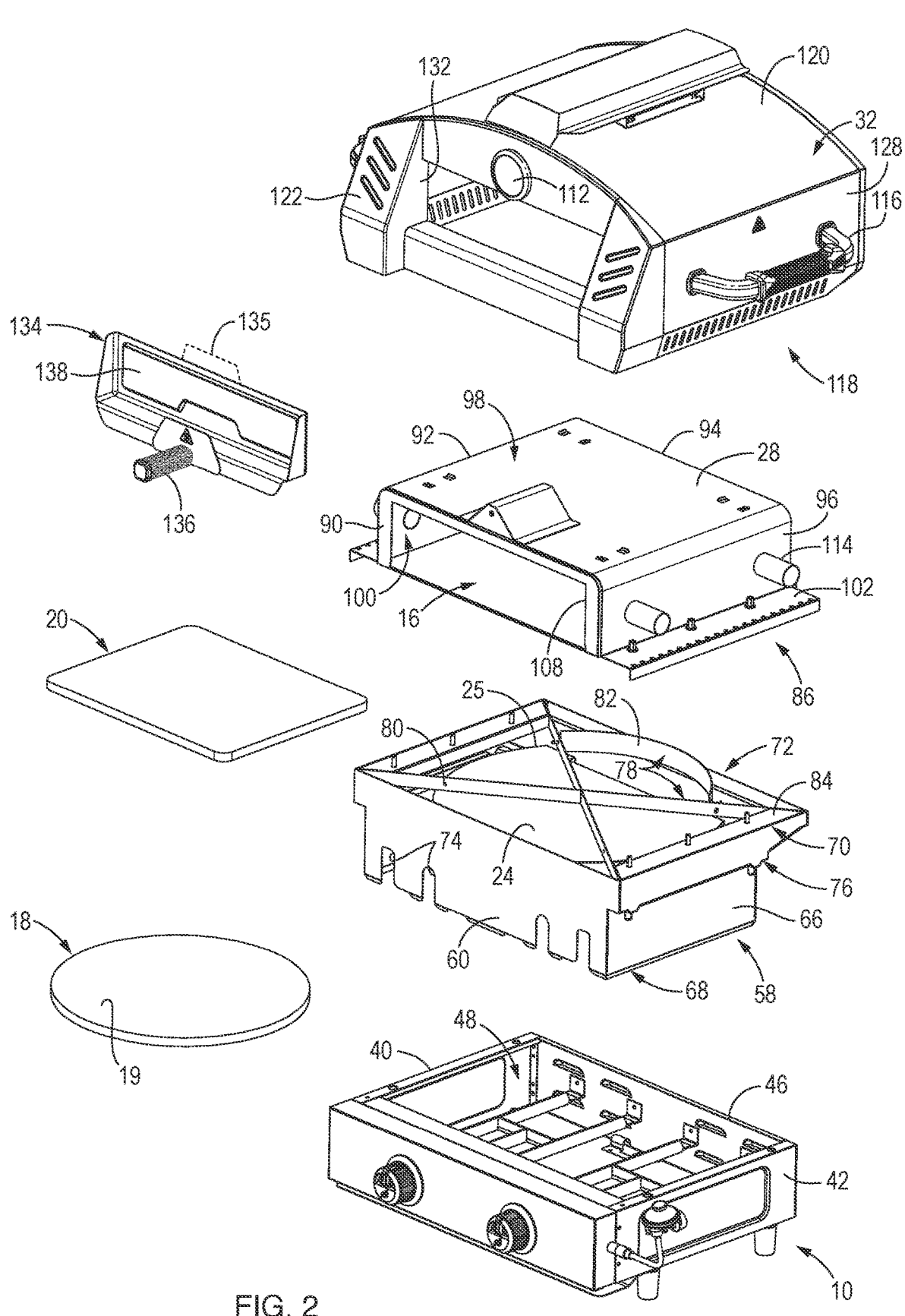
FIG. 2 is an exploded view of the cooking station base and various components of the pizza oven portion, according to another embodiment of the present invention.

Referring to FIGS. 1 and 2, a cooking station 8 or cooking system including a cooking station base 10 and a pizza oven attachment 12 or oven portion is provided. Such pizza oven attachment 12 may be made to be attached to an existing cooking station base 10 as an accessory device or be made to be employed exclusively, or alternatively, with the cooking station base 10. As such, the pizza oven attachment 12 or oven portion may be an accessory device such that the oven portion may be sold separate from the cooking station base 10 or the oven portion 12 may be provided with the cooking station base.

The cooking station base 10 may have one or more heat elements 14 to heat the pizza oven attachment 12. The pizza oven attachment 12 may be positioned on the cooking station base 10 such that the one or more heat elements 14 may warm a baking chamber 16 within the pizza oven attachment 12. The baking chamber 16 of the pizza oven attachment 12 may include a lower stone 18 and an upper stone 20 each of which may be sized and configured to absorb and radiate heat therefrom to cook food, such as pizza, positioned on an upward facing surface 19 of the lower stone 18. As such, the upward facing surface 19 of the lower stone 18 may be a cooking surface. The lower stone 18 may be positioned in such a way that a lower gap 22 (FIG. 3B) may be defined between the lower stone 18 and a heat distribution plate 24. The upper stone 20 may be positioned in such a way that an upper gap 26 (FIG. 3B) may be defined between the upper stone 20 and an upper wall 28 (FIG. 3A) of the baking chamber 16 such that heat may flow along opposing sides of the upper stone 20. The heat distribution plate 24 may be sized and configured to sit above the one or more heat elements 14 such that heat may be absorbed into the distribution plate 24 and distributed evenly to the lower stone 18 such that the heating of the lower stone 18 may be substantially evenly employed thereto. Further, the heat distribution plate 24 may guide the heat along a heat distribution plate periphery 25 and into the baking chamber 16. Furthermore, the baking chamber 16 may include one or more exhaust holes 30 (FIG. 3A) extending to an exterior 32 of the pizza oven attachment 12 that may allow heat to escape the baking chamber 16. The exhaust holes 30 (FIG. 3A) may be defined in a wall of the baking chamber 16 located at a level below the upper stone 20 or at a level between the lower stone 18 and the upper stone 20. With this arrangement, the location of the exhaust holes 30 (FIG. 3A) may facilitate effective cooking of the food product, such as pizza, on the lower stone 18 without having to manually rotate the food product on the lower stone 18 due to the heating of the lower stone 18 being minimized with the lower gap 22 (FIG. 3B) and the heat distribution plate 24. Further, the location of the exhaust holes 30 and the upper gap 26 (FIG. 3B) may accelerate and assist in maintaining high temperatures of the upper stone 20 to effectively heat the upper side of the food product as the bottom side of the food product is cooked on the lower stone 18. In another embodiment, the lower gap 22 (FIG. 3B), the upper gap 26 (FIG. 3B) and exhaust holes 30 (FIG. 3A) may work together advantageously so that the heat produced by the one or more heating elements 14 may heat the lower and upper stones to a level that may be evenly distributed so that the heating of the lower and upper stones 18, 20 may cook food evenly without having to rotate the food product on the lower stone 18.

Figure 1A:
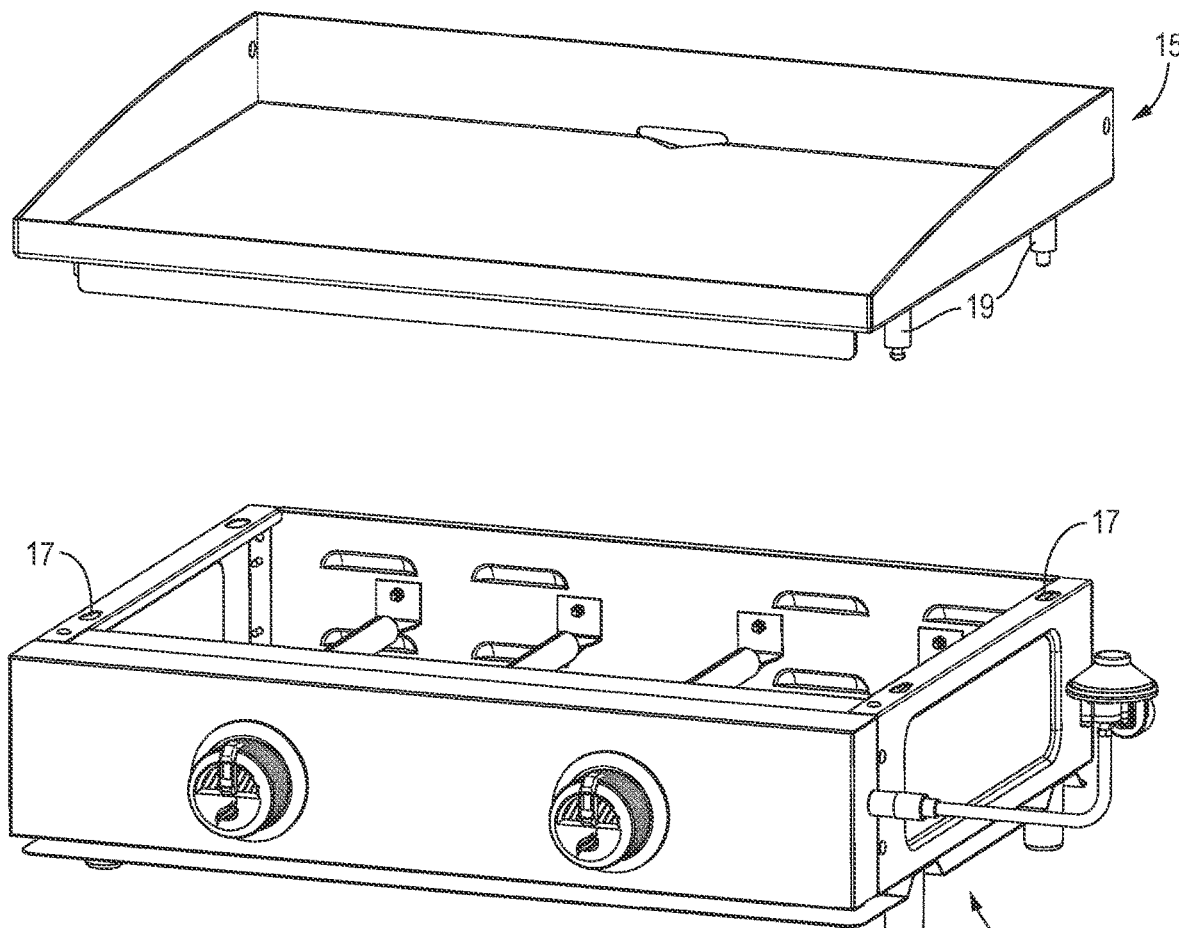
FIG. 1A is an exploded view of the cooking station base and a griddle, according to another embodiment of the present invention.

With reference to FIGS. 1 and 1A, as previously set forth, the cooking station base 10 may be pre-existing such that the pizza oven attachment 12 may be purchased as an accessory device to be used with the pre-existing cooking station base 10. In this embodiment, the cooking station base 10 may have originally been employed to support a griddle 15. Such cooking station base 10 may define apertures 17 therein along an upper surface of the cooking station base 10 such that the apertures 17 may be sized and configured to receive griddle legs 19 to support the griddle 15 on the cooking station base 10. In another embodiment, the cooking station base 10 may be purchased by a user to be employed with the oven portion 12 or alternatively the griddle 15. In another embodiment, the cooking station base 10 may be employed exclusively with the oven portion 12.

Figure 5:
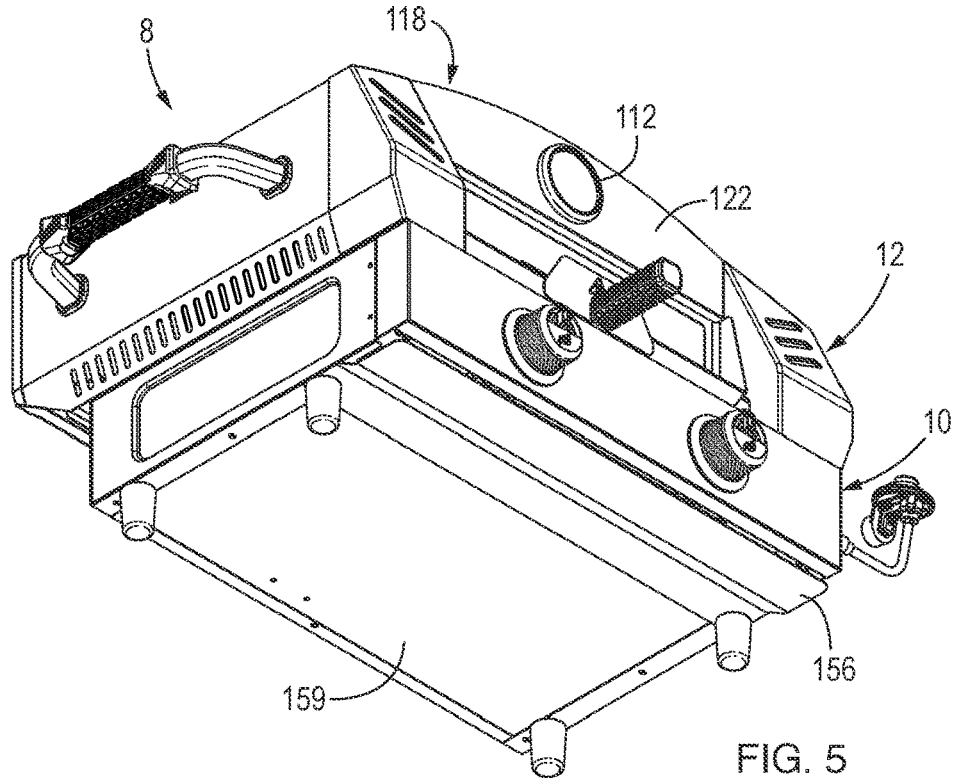
FIG. 5 is a bottom perspective view of the cooking station, according to another embodiment of the present invention.

With reference to FIG. 1, the cooking station base 10 may include a main body 34 with an upper side 36 and lower side 38 both of which may extend to correspond with the other. The main body 34 may further define a left side 40, a right side 42, a front side 44 and a rear side 46 each of which may extend to the upper side 36 and the lower side 38 so as to define an inner portion 48 between the sides. Further, the upper and lower side 36, 38 may extend continuously along the left, right, front and rear side 40, 42, 44, 46 to further define the inner portion 48. In some embodiments, the lower side 38 may be open to allow for heat to escape out of the cooking station base 10. In another embodiment, the lower side 38 may extend to define a lower panel 159 (FIG. 5).

Further, the previously set forth, one or more heat elements 14, which may be one or more flame burners 50, may be sized and configured to be positioned within the inner portion 48 of the main body 34. The one or more flame burners 50 may include and employ various structural and functional components in which allow the one or more flame burners 50 to provide heat as known to one of ordinary skill in the art. Further, the one or more flame burners 50 may come in multiple configurations and produce an open flame to heat a cooking attachment, such as the oven portion 12 and/or the griddle 15. The heat generated from the one or more flame burners 50 may be produced by a gas source which may be a propane or natural gas source. The gas source may be connected to a gas line which may include various components to allow the gas source to flow into the main body and through the one or more flame burners 50. The front side 44 may have one or more burner knobs 52 positioned to correspond with the one or more flame burners 50 such that the one or more burner knobs 52 block or progressively open the gas line for the gas source to enter the one or more flame burners 50. The front side 44 may include an ignitor switch that may be sized and configured to ignite the gas source within the one or more flame burners 50. For example, the ignitor switch may produce a spark to ignite the gas in the one or more flame burners 50 for the purpose of generating a flame from the gas supplied thereto. Further, the ignitor switch may be located on the front side 44 as an ignitor button or within the one or more burner knobs 52 that may ignite upon turning the one or more burner knobs 52 to an open position. The rear wall may include multiple elongated vents 54 that may assist in air ventilation into and out of the inner portion 48 so as to provide external oxygen to the flame burners 50. Further, in other embodiments, the left and right side 40, 42 may include the elongated vents 54 to further assist in air ventilation to the inner portion 48 of the main body 34. The main body 34 of the cooking station base 10 may be sized and configured to effectively support multiple sizes and configurations of cooking top accessories. For example, the cooking top accessories may include the before discussed griddle 15 (FIG. 1A), a grill member attachment, or the pizza oven attachment 12 each of which may be accessories to the cooking station base 10. Further, the cooking station base 10 may include typical structural and functional components implemented therewith such as valves, tubing, fasteners, and various frame components to properly stabilize and appropriately control the gas source implemented with the cooking station base 10, as known to one of ordinary skill in the art.

Further, the lower side 38 of the main body 34 may include legs 56 that may be placed on a flat surface to stabilize the cooking station base 10. The legs 56 may vary in length to raise or lower the cooking station base 10. For example, the legs 56 may be extendable to increase the height of the cooking station base 10 or the cooking station base 10 may come with leg attachments that may allow the cooking station base to be placed on a stabilized table top. In some embodiments, the legs 56 of the cooking station base 10 may include functionality that may allow the cooking station base 10 to become readily portable and, in some embodiments, compactable such that the cooking station base 10 may be readily placed in a small space or a vehicle for transfer to another location. Further, in another embodiment the legs 56 may be elongated to hold the cooking station 10 at a desired height, such as a table or counter-top height. In another embodiment, the legs 56 may be elongated and may include caster wheels to aid in the portability of the cooking station 8. In some embodiments, the cooking station base 10 may include side handles to assist in the moving and adjustment of the cooking station base 10. Further, in some embodiments, the main body 34 of the cooking station base 10 may include one or more side shelves located adjacent to the left or right side 40, 42 of the main body 34 to provide a flat surface to place cooking materials or food products, or the like.

Figures 3, 3A:
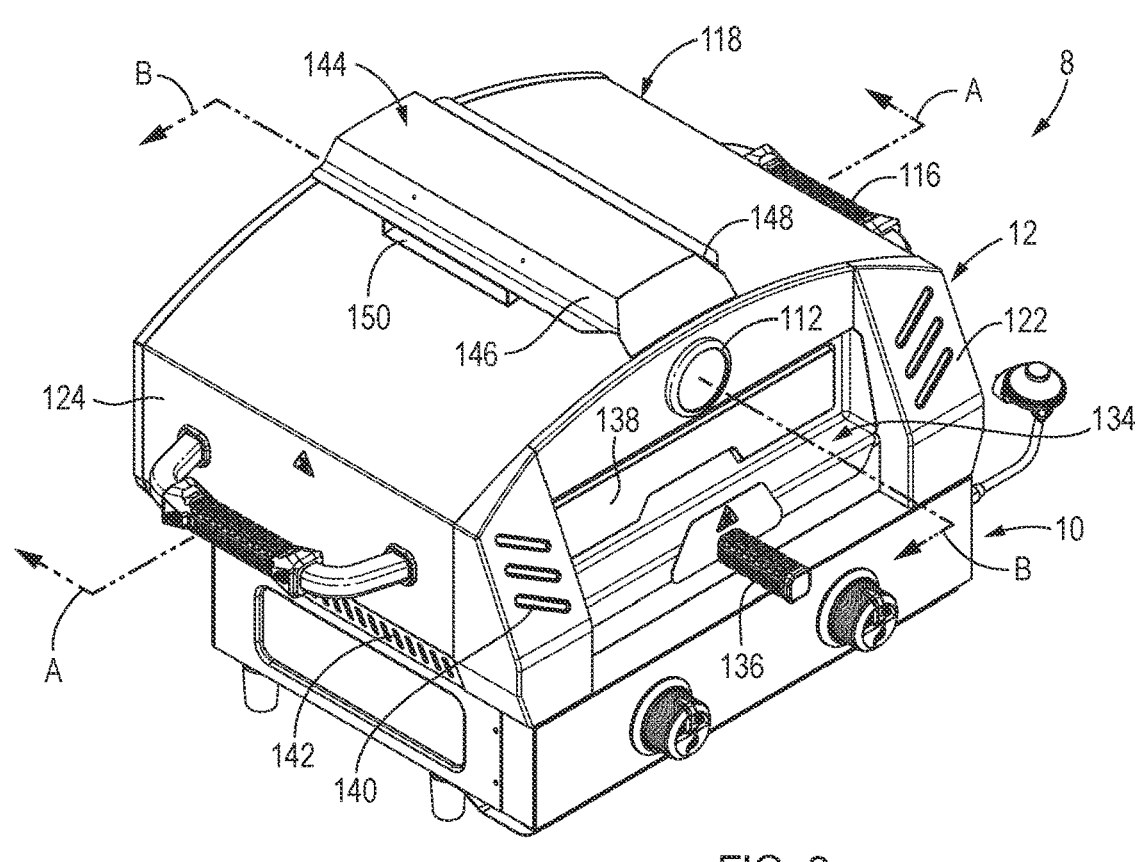
FIG. 3 is a perspective view of a cooking station, depicting the cooking station base and the pizza oven portion positioned thereon, according to another embodiment of the present invention.
FIG. 3A is a cross sectional perspective view of the cooking station taken along section line A-A in FIG. 3, according to another embodiment of the present invention.
Figure 3B:
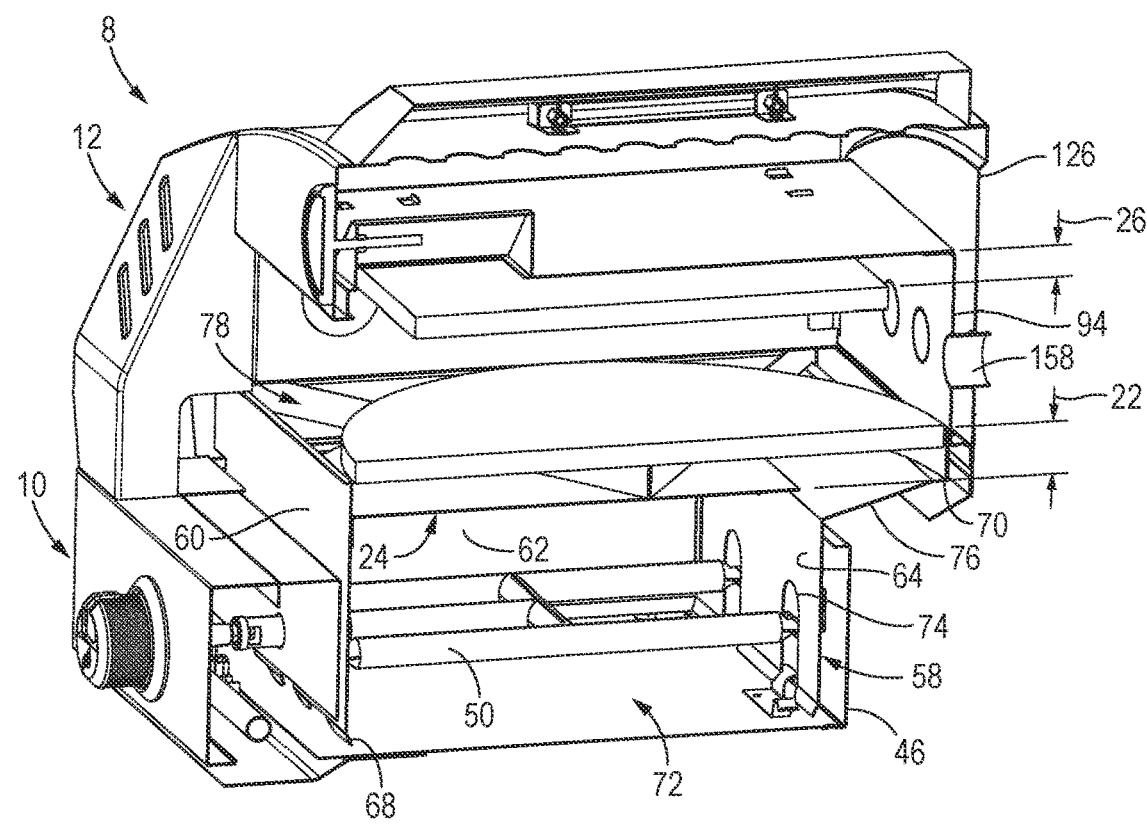
FIG. 3B is a cross sectional perspective view of the cooking station taken along section line B-B in FIG. 3, according to another embodiment of the present invention.

Now with reference to FIGS. 2 and 3B, the pizza oven attachment 12 of the cooking station 8 may include an inner shell base 58. The inner shell base 58 may be sized and configured to correspond with the cooking station base 10.

The inner shell base 58 may include a front barrier 60, left barrier 62, rear barrier 64 and right barrier 66. The front, left, rear and right barriers 60, 62, 64, 66 may extend to a first periphery 68 and a second periphery 70. Further, the front, left, rear and right barriers 60, 62, 64, 66 may be sized and configured to extend and define an inner space 72. The front and rear barrier 60, 64 may include one or more elongated grooves 74 located at the first periphery 68. The first periphery 68 of the inner shell base 58 may be sized to slide into the inner portion 48 of the cooking station base 10 such that the one or more elongated grooves 74 may fit and slide around the one or more flame burners 50. The one or more flame burners 50 may be positioned in the inner space 72 of the inner shell base 58. When the inner shell base 58 is placed into the cooking station base 10 the front, left, rear, and right barriers 60, 62, 64, 66 may extend upwards from the first periphery 68 above the front, left, rear and right sides 44, 40, 46, 42 of the cooking station base 10 such that heat produced by the one or more flame burners 50 may be guided upwards past the cooking station base 10 towards the baking chamber 16. The left, rear and right barrier 62, 64, 66 may include a ridge 76 or an outward flare that may extend to the second periphery 70 and that may extend outwards over the left, right and rear sides 40, 42, 46 of the cooking station base 10. In some embodiments, the ridge 76 may rest on and be flush with the left, right and rear sides 40, 42, 46 of the cooking station base 10. In some embodiments, the rear barrier 64 may include the ridge 76 or a slanted panel portion that may extend outwards past the rear side 46 of the cooking station base 10.

Further, the inner shell base 58 may include a heat distribution plate 24 which may be positioned below the second periphery 70 within the inner space 72. The heat distribution plate 24 may be sized and configured to at least partially correspond with the shape of the lower stone 18 such that the heat distribution plate 24 may be circular in shape and extend toward the front, left, rear and right barriers 60, 62, 64, 66 such that a heat flow gap 77 (FIG. 3A) is defined between the heat distribution plate periphery 25 and the adjacent barriers of the inner shell base 58. The heat distribution plate 24 may be warmed by heat provided by the one or more flame burners 50 so as to guide the heat toward and through the heat flow gap 77 (FIG. 3A) and into the baking chamber 16. Further, the inner shell base 58 or the distribution plate 24 may include a resting structure 78 or ridge structure coupled thereto. The resting structure 78 may extend with a diagonal structure 80 and a partial circular structure 82 that may be sized and configured to be positioned above the heat distribution plate 24 such that the lower gap 22 is defined between the heat distribution plate 24 and the resting structure 78. As such, the resting structure 78 may be within the lower gap 22. Further, the diagonal structure 80 may span from opposite ends of the left barrier 62 over the inner space 72 to opposite ends of the right barrier 66. The partial circle structure 82 may span at the rear barrier 64 from opposite diagonal structures 80. In some embodiments, the resting structure 78 or ridge structure may be sized and configured to support the lower stone 18 such that the lower stone 18 may be positioned and stabilized on the resting structure 78. The second periphery 70 may include a ledge 84 that may be positioned to extend inwards from the left, rear and right barriers 62, 64, 66. The ledge 84 may have a larger width on the left and right barrier 62, 66 compared to the rear barrier 64.

Now with reference to FIGS. 2, 3A, and 3B, the pizza oven attachment 12 of the cooking station 8 may include an inner shell 86 that may be sized and configured to correspond with the inner shell base 58. The inner shell 86 may have an upper wall 28, a front wall 90, a left wall 92, a rear wall 94 and a right wall 96. The upper, front, left, rear and right walls 28, 90, 92, 94, 96 may be sized and configured to at least partially define the baking chamber 16. The upper, front, left, rear and right walls 28, 90, 92, 94, 96 of the inner shell 86 may have an outer surface 98 and an inner surface 100 where the inner surface 100 may be located within the baking chamber 16. The left and right walls 92, 96 may include an extension 102 that extends outward from the outer surface 98 to form an L shape. The extension 102 may be sized and configured to correspond with the ledge 84 of the inner shell base 58 such that the extension 102 may rest and attach to the ledge 84. Further, the L shape the extension 102 may grip the ridge 76 of the left and right barriers 62, 66 of the inner shell base 58. The inner surface 100 of the upper wall 28 may include a holding structure 104 or ledge structure (see also FIG. 4A). The holding structure 104 may include at least two or more L-bars 106 extending downward from the upper wall 28 (or from adjacent walls) and into the baking chamber 16. Further, the holding structure 104 may be sized and configured to support and hold the upper stone 20 such that the upper gap 26 (FIG. 3B) may be defined between the upper stone 20 and the inner surface 100 of the upper wall 28. The upper stone 20 may be sized and configured to correspond with the upper wall 28 of the baking chamber 16 so as to extend parallel therewith. In some embodiments, the upper stone 20 may be rectangular or square in shape. The inner shell 86 may be positioned above and/or attached to the inner shell base 58 such that the resting structure 78 may sit within the baking chamber 16 of the inner shell 86. The resting structure 78 may be sized and configured to hold the lower stone 18 such that the lower stone 18 may extend with a parallel relationship relative to the upper stone 20. In other words, the facing surfaces of the lower stone 18 and upper stone 20 may be parallel relative to each other. In some embodiments the lower stone 18 may be sized and configured to extend the depth of the baking chamber 16 and be round to place a food product, such as a pizza, onto the lower stone 18. The lower stone 18 may sit on the resting structure 78 above the lower gap 22 (FIG. 3B). The heat produced by the one or more flame burners 50 may flow upwards to an underside of the heat distribution plate 24, flow through the heat flow gap 77 defined between the barrier walls of the inner shell base 58 and the heat distribution plate periphery 25, and flow upward into the baking chamber 16 and toward the upper stone 20, as shown by flow arrows 107. In some embodiments, the heat distribution plate 24 may radiate heat into the lower gap 22 (FIG. 3B) and heat the lower stone 18. Further, the heat may flow upwards towards the upper stone 20 and into the upper gap 26 (FIG. 3B), as shown by flow arrows 107. As the upper stone 20 absorbs heat, the upper stone 20 may radiate heat downward toward the lower stone 18 and the food product positioned thereon. The lower gap 22 (FIG. 3B) and upper gap 26 (FIG. 3B) may allow for the heat to warm the lower and upper stones 18, 20 so as to cook upper and lower sides of food positioned on the lower stone 18 in a substantially even manner.

Further, the rear wall 94 may define one or more exhaust holes 30 or exhaust ports that may be positioned at a level between the lower stone 18 and the upper stone 20 in the baking chamber 16. The exhaust holes 30 may be sized and configured to allow heat to be released from the baking chamber 16. The front wall 90 may define an open window 108 or front oven opening which may be sized and configured to allow access of cooking utensils and food products into the baking chamber 16 and onto the lower stone 18. The outer surface 98 of the upper wall 28 may extend to a chamber 110 in which a thermometer 112 (FIG. 3) or temperature gauge may be placed to continually read the temperature within the baking chamber 16. Such chamber 110 may be exposed and in direct communication with the baking chamber 16 so that a probe of the thermometer 112 may sit within the chamber 110 and obtain temperature readings substantially consistent with the baking chamber 16. The outer surface 98 of the left and right walls 92, 96 may include one or more inserts 114. The inserts 114 may be sized and configured to facilitate fastening handles 116 to the pizza oven attachment 12.

Now with reference to FIGS. 2, 3 and 3A, the pizza oven attachment 12 may include an outer shell 118. The outer shell 118 may include an outer upper wall 120, an outer front wall 122, an outer left wall 124, an outer rear wall 126 (FIG. 3B) and an outer right wall 128. The outer shell 118 may be sized and configured to encase the inner shell 86 and the ridge 76 of the inner shell base 58 when being in the mounted position. Further, the outer shell 118, upon being in the mounted position, may define a draft gap 130 between the inner shell 86 and the outer shell 118. The draft gap 130 may be sized and configured to substantially prevent the outer shell 118 from overheating. The outer front wall 122 may define an oven opening 132 which may be sized and configured to correspond with the open window 108 of the inner shell 86. The oven opening 132 may have a depth in which a removable door 134 may be positioned to contain heat within the baking chamber 16. The removable door 134 may include a grip 136 or door handle in which the user can grasp the grip 136 and remove the door from its position. The removable door 134 may also include a transparent portion 138 to allow the user to look into the baking chamber 16 without losing heat. Further, in another embodiment, the removable door 134 may include a flange 135 or lip (shown as a dashed line) that may extend upward from a back surface of the removable door 134. Upon the door being positioned to cover the oven opening 132, the flange 135 may assist in holding the removable door 134 within the oven opening 132 such that the flange 135 may be positioned behind an upper surface (e.g., behind the thermometer 112) of the oven opening 132 of the pizza oven attachment 12. In this manner, the flange 135 may assist the removable door 134 from inadvertently becoming removed or ajar from the oven opening 132 of the pizza oven attachment 12.

Figure 4:
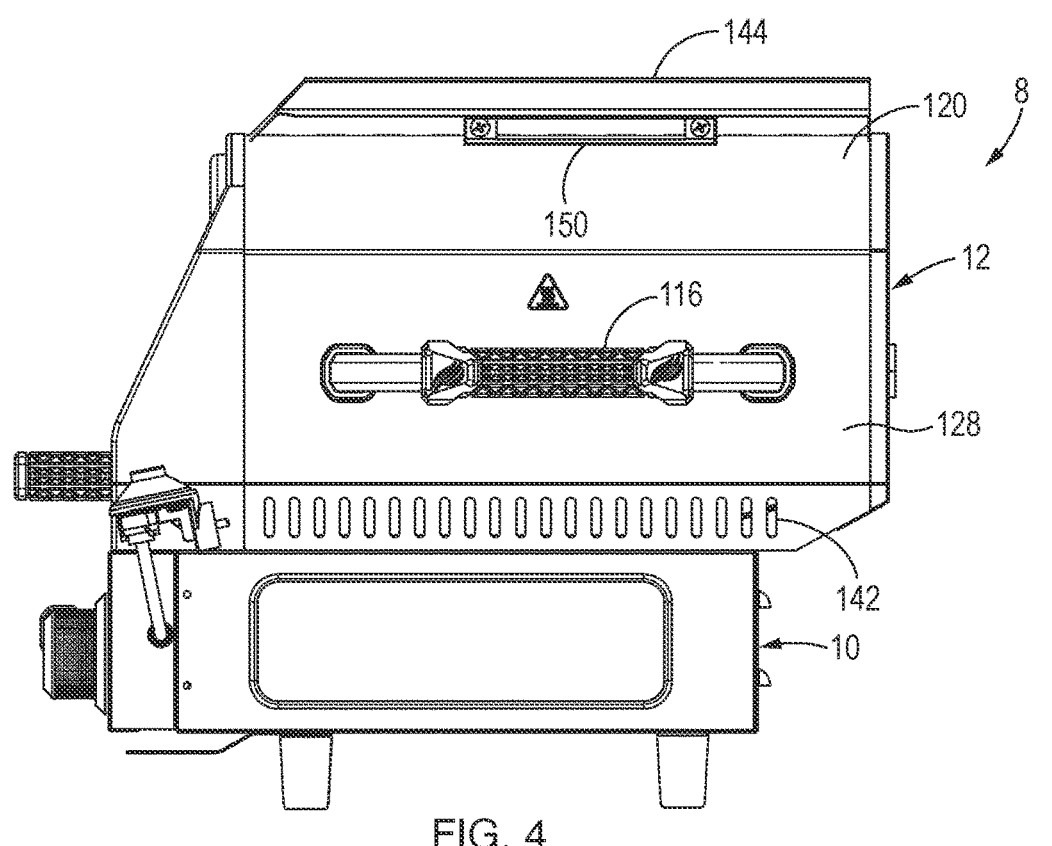
FIG. 4 is a side view of the cooking station, according to an embodiment of the present invention.

With reference to FIGS. 3, 3A and 4, the outer front wall 122 may include intermediate vents 140 and lower vents 142 that may facilitate drawing external air into the draft gap 130 so that the external air can assist in cooling the outer shell 118. The outer left and outer right walls 124, 128 may include handles 116 that may attach to the one or more inserts 114. The handles 116 may allow the user to lift and move the pizza oven attachment 12 from the cooking station base 10 of the cooking station 8. The left and right walls 124, 128 may include multiple lower vents 142 to draw external air into the draft gap 130 to assist in cooling the outer shell 118. In some embodiments, the outer upper wall 120 may extend with a curve or radius to exhibit a dome configuration. The outer upper wall 120 may include a fin 144 or rain cover extending along the depth of the outer upper wall 120. The fin 144 may have a left wing 146 and right wing 148. The left and right wings 146, 148 may include one or more raised vents 150 that may allow for air to escape from the draft gap 130 defined between the inner and the outer shells 86, 118. In some embodiments, the outer upper wall 120 may include ventilation holes 152 (FIG. 3B) that may extend the depth of the outer upper wall 120. The fin 144 may act as a rain covering for the ventilation holes 152 (FIG. 3B) such that the air escaping the ventilation holes 152 (FIG. 3B) may only leave the fin 144 by the one or more raised vents 150. In this manner, the sloping vents 140 and lower vents 142 may facilitate pulling external air through the draft gap 130 so as to flow upwards toward the ventilation holes 152 to escape through the one or more raised vents 150, as shown by arrow 155.

Figure 4A:
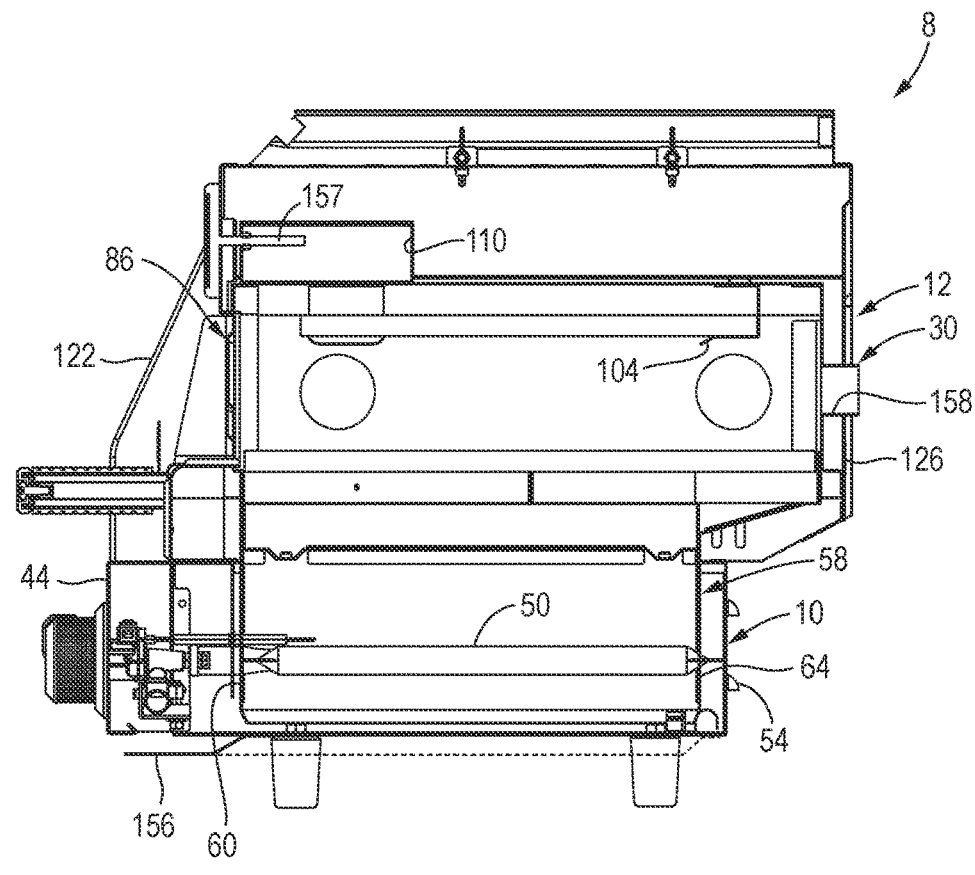
FIG. 4A is a cross sectional side view of the cooking station taken along section line A-A in FIG. 3, according to another embodiment of the present invention.

With reference to FIGS. 4A and 5, the outer front wall 122 of the outer shell 118 may extend past the inner shell base 58 and inner shell 86. Further, the front wall 122 may be flush with the front side 44 of the cooking station base 10. The front wall 122 may include the thermometer 112 having a probe 157 that may extend into the chamber 110 of the inner shell 86. The exhaust holes 30 defined in the rear wall 94 may each include a tube 158 extending through the draft gap 130 between the inner and outer shells 86, 118. The draft gap 130 defined between the inner and outer shells 86, 118 may extend continuously around the inner shell 86. The tubes 158 extending from the exhaust holes 30 may allow heat to escape the baking chamber 16 and pizza oven attachment 12 without entering the draft gap 130. The front barrier 60, left barrier 62 (FIG. 3A), rear barrier 64 and right barrier 66 (FIG. 3A) of the inner shell base 58 may extend from the lower side 38 of the cooking station base 10 such that the rear barrier 64 may shield the elongated vents 54 of the rear side 46 to contain the heat produced from the one or more flame burners 50. Further, in one embodiment, a heat shield 156 may be positioned along the lower side 38 of the cooking station base 10 of the cooking station 8. Such heat shield 156 may be positioned and extend below a lower panel 159 of the base 10 with a gap therebetween. The heat shield 156 may assist in shielding heat from the surface on which the base 10 sits, such as a counter-top or table, as well as assist in shielding heat from a front panel 44 and components adjacent thereto. Such heat shield 156 may extend partially below the lower panel 159 of the base 10, as depicted in FIGS. 4A and 5, or the heat shield 156 may extend below a majority or most of the lower panel 159 with the gap therebetween, as shown by the dashed line in FIG. 4A. As set forth herein, the oven portion 12 may include structure and functionality to control and provide even heating of the food product on the lower stone 18 as well as structure to circulate air to minimize high temperatures to the outer shell 118 of the oven portion 12.

The various structural components of the embodiments of the cooking station and oven portion set forth herein may be formed from metallic materials, such as stainless steel or aluminum, or any other suitable metallic material, or some components may be formed from one or more polymeric materials, as known to one of ordinary skill in the art. Also, the upper and lower stones may be baking type stones or pizza type stones known to those of ordinary skill in the art. Further, the components of the cooking station and oven portion may be formed by employing known manufacturing techniques and processes, such as welding, molding, milling, drilling, bending, fastening, etc., as known to one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A cooking system for baking a food product, the cooking system comprising:

a base body extending to define an upper edge with one or more gas flame burners supported by the base body, the gas flame burners extending below the upper edge, the base body extending to define a front base side and a rear base side thereof; and an oven portion extending to define a front oven side, a rear oven side, and first and second oven sides, the front and rear oven sides corresponding with the front and rear base sides of the base body, the oven portion including an inner shell, an outer shell, a lower stone, and an upper stone, the inner shell including a ridge surface and a ledge surface such that the inner shell is sized and configured to be positioned at least partially above the base body, the lower stone sized to be positioned over the ridge surface and the upper stone sized to be positioned over the ledge surface so that the lower stone is positioned substantially parallel relative to the upper stone such that a baking chamber is defined therebetween, the outer shell sized to be positioned over the inner shell with a gap defined between the inner and outer shells, the outer shell configured to receive an oven door positionable over an access opening defined in the outer shell, the access opening sized and configured to facilitate accessing the food product in the baking chamber such that the access opening is accessed along the front oven side of the oven portion, the inner shell defining exhaust ports positioned below the upper stone to funnel heat directly from the baking chamber, the exhaust ports including tube structure, the tube structure extending from the exhaust ports and through the outer shell for exhausting heat from the oven portion externally at a level below the upper stone along the rear oven side of the oven portion, wherein the tube structure comprises a plurality of adjacent exhaust tubes that extend across the oven portion.

2. The cooking system of claim 1, wherein the oven portion is removable from the base body such that the base body is sized and configured to support a griddle or the oven portion thereon.

3. The cooking system of claim 1, wherein the inner shell defines grooves therein, the grooves being sized and configured to be positioned over the gas flame burners of the base body such that the oven portion is moveable from the base body.

4. The cooking system of claim 1, wherein the oven door is removable from the oven portion with a door handle.

5. The cooking system of claim 1, further comprising a heat distribution plate, the heat distribution plate positioned directly below the lower stone such that the heat distribution plate is spaced from the lower stone with a lower stone gap defined between the heat distribution plate and the lower stone.

6. The cooking system of claim 1, wherein the outer shell defines vents along a lower periphery thereof and defines top side exhaust ports along a top side of the outer shell, the vents being sized and configured to draw external air into the gap between the inner and outer shells to move the external air within the gap toward the top side of the outer shell to move through the top side exhaust ports of the outer shell.

7. The cooking system of claim 1, wherein the base body includes a heat shield placed on a lower side thereof to block heat produced by the one or more heating elements.

8. The cooking system of claim 1, wherein, upon the heat being funneled through the tube structure, the heat moves through the gap without entering into the gap.

9. An accessory device for use with a cooking station and configured to bake a food product therein, the cooking station including a base body extending to define an upper edge with one or more gas flame burners supported by the base body and positioned below the upper edge, the accessory device comprising:

an oven member extending to define a front side, a rear side, and first and second sides, the front and rear oven sides configured to correspond with front and rear base sides of the base body, the oven member including:

an inner shell including a ridge surface and a ledge surface, the inner shell configured to be positioned at least partially above the base body, the inner shell defining exhaust ports therein;

a lower stone and an upper stone, the lower stone configured to be positioned over the ridge surface of the inner shell and the upper stone configured to be supported on the ledge surface of the inner shell so that the lower stone is positioned substantially parallel relative to the upper stone such that a baking chamber is defined by the lower and upper stones and at least partially by the inner shell, the exhaust ports positioned in the inner shell at a level below the upper stone; and an outer shell sized to be positioned over the inner shell with a gap defined between the inner and outer shells, the outer shell including an oven door positionable over an access opening defined in the outer shell, the access opening sized and configured to facilitate accessing the food product in the baking chamber such that the access opening is accessed along the front side of the oven member, the outer shell including tubing extending from each one of the exhaust ports and through the outer shell to funnel heat directly from the baking chamber, the tubing configured to exhaust heat from the oven member externally at a level below the upper stone along the rear side of the oven member;

wherein the tubing comprises a plurality of adjacent exhaust tubes that extend across the oven member.

10. The accessory device of claim 9, wherein the oven door is removable from the outer shell.

11. The accessory device of claim 9, further comprising a heat distribution plate, the heat distribution plate positioned directly below the lower stone such that the heat distribution plate is spaced from the lower stone with a lower stone gap defined between the heat distribution plate and the lower stone.

12. The accessory device of claim 9, wherein the outer shell defines vents along a lower periphery thereof and defines top side exhaust ports along a top side of the outer shell, the vents being sized and configured to draw external air into the gap between the inner and outer shells to move the external air within the gap toward the top side of the outer shell to move through the top side exhaust ports of the outer shell.

13. The accessory device of claim 9, wherein, upon the heat being funneled through the tubing, the heat moves through the gap without entering into the gap.

14. A method for controlling heat generated by a cooking station base, the cooking station base extending to define an upper edge with one or more gas flame burners supported by the cooking station base and positioned below the upper edge, the method comprising:

providing an oven portion positioned above the cooking station base such that the oven portion includes an inner shell, an outer shell, a lower stone, and an upper stone, the inner shell defining a ridge surface and a ledge surface such that the lower stone is positioned over the ridge surface and the upper stone is positioned adjacent the ledge surface so that the upper stone is positioned substantially parallel relative to the lower stone to define a baking chamber therebetween, the outer shell positioned over the inner shell with a gap defined between the inner and outer shells, the outer shell being associated with a removable oven door such that the oven door is positionable over an access opening defined in the outer shell;

heating the baking chamber with the one or more gas flame burners and with the access opening defined in the outer shell being closed-off with the removable oven door so that the heat from the one or more gas flame burners flows around a heat distribution plate positioned below the lower stone and so that the heat flows upward to heat the upper stone; and funneling the heat out of the baking chamber through tube structure extending from heat exhaust ports defined in the inner shell, wherein the heat exhaust ports are positioned at a level below the upper stone, and wherein the tube structure extends from the baking chamber, through the gap, and through the outer shell to exhaust the heat externally at a level below the upper stone and from a rear side of the oven portion, the tube structure comprising a plurality of adjacent exhaust tubes that extend across the oven portion.

15. The method according to claim 14, further comprising removing the oven door from the oven portion with a door handle.

16. The method according to claim 14, wherein the heating comprises minimizing the heating of the lower stone with the heat distribution plate being spaced from the lower stone with a lower stone gap defined between the heat distribution plate and the lower stone.

17. The method according to claim 14, further comprising venting external air through the gap with vents defined in the outer shell along a lower periphery of the outer shell and top side exhaust ports defined in the outer shell along a top side of the outer shell such that the external air is drawn through the vents and into the gap between the inner and outer shells to move upward to cool the outer shell and move toward the top side of the outer shell to move through the top side exhaust ports of the outer shell.

* * * * *